(12) United States Patent
Chen et al.

(10) Patent No.: US 8,799,038 B2
(45) Date of Patent: Aug. 5, 2014

(54) DYNAMIC TAXI-SHARING SYSTEM AND SHARING METHOD THEREOF

(75) Inventors: Wen-Tsuen Chen, Hsinchu (TW); Po-Yu Chen, Kaohsiung (TW); Je-Wei Liu, Taipei (TW)

(73) Assignee: National Tsing Hua University, Hsinchu (TW)

( * ) Notice: Subject to any disclaimer, the term of this patent is extended or adjusted under 35 U.S.C. 154(b) by 460 days.

(21) Appl. No.: 13/227,062

(22) Filed: Sep. 7, 2011

(65) Prior Publication Data

US 2013/0060586 A1 Mar. 7, 2013

(51) Int. Cl.
| | |
|---|---|
| *G06Q 10/06* | (2012.01) |
| *G06Q 10/10* | (2012.01) |
| *G08G 1/00* | (2006.01) |
| *G06Q 10/02* | (2012.01) |

(52) U.S. Cl.
CPC .............. *G08G 1/202* (2013.01); *G06Q 10/06* (2013.01); *G06Q 10/109* (2013.01); *G06Q 10/02* (2013.01)
USPC ................ 705/5; 705/1.1; 705/6; 705/14.14; 705/14.19

(58) Field of Classification Search
CPC ..... G06Q 10/02; G06Q 50/14; G01C 21/3438
USPC .............. 705/1.1, 5, 6, 14.14, 14.19; 701/201
See application file for complete search history.

(56) References Cited

U.S. PATENT DOCUMENTS

| | | | | |
|---|---|---|---|---|
| 7,080,019 | B1* | 7/2006 | Hurzeler | 705/6 |
| 8,140,256 | B1* | 3/2012 | dos-Santos et al. | 701/400 |
| 2003/0177020 | A1* | 9/2003 | Okamura | 705/1 |
| 2004/0049424 | A1* | 3/2004 | Murray et al. | 705/14 |
| 2004/0158483 | A1* | 8/2004 | Lecouturier | 705/6 |
| 2007/0276595 | A1* | 11/2007 | Lewinson et al. | 701/209 |
| 2011/0054956 | A1* | 3/2011 | Meyer et al. | 705/5 |
| 2011/0166774 | A1* | 7/2011 | Schunder | 701/201 |

OTHER PUBLICATIONS

Grynbaum, Michael M, "Limited Share-A-Cab Test to Begin Soon", Feb. 21, 2010, New York times, 3 pages.*

(Continued)

*Primary Examiner* — John Hayes
*Assistant Examiner* — Freda A Nelson
(74) *Attorney, Agent, or Firm* — Wang Law Firm, Inc.; Li K. Wang; Stephen Hsu (57) ABSTRACT

A dynamic taxi-sharing system and a sharing method thereof. A ride-sharing service provider carries at least one passenger from the first current location to the first travel destination through a route in an area and sends registration information to a service server. A plurality of ride-sharing requests is sent to the service server, and each of the ride-sharing requests comprises the second current location and the second travel destination. The service server divides the area into n by n blocks. A ride-matching module of the service server chooses a destination area in which the first travel destination is a center point and divides the destination area into k by k blocks. According to the registration information and the ride-sharing requests, the ride-matching module matches at least one ride-sharing traveler to the ride-sharing service provider to achieve a goal of fuel-saving and pollution-reducing.

16 Claims, 12 Drawing Sheets

(56) References Cited

OTHER PUBLICATIONS

Tao, Chichung and Wu, Chungjung, "Behavioral Responses to Dynamic Ridesharing Services—The Case of Taxi-Sharing Project in Taipei", Oct. 12-15, 2008; proceedings of 2008 IEEE International Conference on Service Operations and Logistics, and Informatics (IEEE/SOLI 2008. IEEE International Conference), pp. 1576-1581.*

Chen, Po-Yu; Liu, Je-Wei; and Chen, Wen-Tsuen, A Fuel-Saving and Pollution-Reducing Dynamic Taxi-Sharing Protocol in VANETs, Sep. 6-9, 2010; 2010 IEEE 72nd Vehicular Technology Conference Fall in Ottawa, Canada, 5 pages.*

Chen, Po-Yu; Guo, Yi-Mini; and Chen, Wen-Tsuen; "Fuel-Saving Navigation System in VANETs", Sep. 6-9, 2010; 2010 IEEE 72nd Vehicular Technology Conference Fall in Ottawa, Canada, 5 pages.*

Bo Yu, Jiayu Gong, and Cheng-Zhong Xu; "Catch-Up: A Data Aggregation Scheme for VANETs", Sep. 15, 2008.

Hongzi Zhu, Yanmin Zhu, Minglu Li, and Lionel M. Ni; "SEER: Metropolitan-scale Traffic Perception Based on Lossy Sensory Data", Apr. 19-25, 2009; IEEE.

Stephan Hartwig and Michael Buchmann; "Empty Seats Traveling: Next-generation ridesharing and its potential to mitigate traffic- and emission problems in the 21st century"; Nokia Research Center, NRC-TR-2007-003; Feb. 14, 2007.

* cited by examiner

DYNAMIC TAXI-SHARING SYSTEM AND SHARING METHOD THEREOF

BACKGROUND OF THE INVENTION

1. Field of the Invention

The exemplary embodiment(s) of the present invention relates to a field of taxi-sharing system. More specifically, the exemplary embodiment(s) of the present invention relates to a dynamic taxi-sharing system and a sharing method thereof capable of fuel-saving and pollution-reducing.

2. Description of Related Art

Recently, Vehicular Ad-hoc Network (VANET) has been regarded as an emerging and promising field because it can provide safety and more efficient roads for passengers. In VANET, each vehicle can detect neighboring traffic conditions by on-board sensor units and exchange the detected information via vehicle to vehicle (V2V) and vehicle to road (V2R) communication, disclosed by Bo Yu, J. Y Gong, and C. Z Xu, "Catch-UP: A Data Aggregation Scheme for VANETs," in Proceedings of the fifth ACM international workshop on VehiculAr Inter-NETworking (VANET'08), pp. 49-57, September 2008 and by H. Z Zhu, Y. M Zhu, M. L Li, and Lionel M. Ni "SEER: Metropolitan-scale Traffic Perception Based on Lossy Sensory Data," in Proceedings of the 28th Conference on Computer Communications (INFOCOM '09), pp. 217-225, April 2009. ITS adds information and communications technology (VANET) to traditional transport infrastructure so it can estimate the real-time traffic condition on roads and provide services like navigation and trip planning to improve driving efficiency.

However, the traffic congestion problem in urban area of many countries cannot be solved completely by adopting ITS due to the high density of private vehicles and a traffic jam also brings economic and environmental impacts, such as fuel consumption. So, a carpooling service is proposed to reduce the use of private cars. Carpoolers use pool members' private cars, or a jointly hired vehicle, for private shared journeys. The traditional carpooling service partially reduce the amount of private cars and the efficient way to mitigate the traffic congestion problem in urban area is to use public transportation, such as bus, Mass Rapid Transit (MRT), and taxi.

Traditional carpooling service usually requires human coordination and asks carpoolers to specify their ride-sharing routes on the web beforehand, and the ride-matching server will find the most suitable partners for each route after a period of time, disclosed in Quality carpool Service, which makes service inflexible. On the contrary, the ride-sharing service performs a carpooling match automatically and rapidly for approval by travelers. In Taiwan, a project for ride-sharing services also shows that taxi-sharing service is most suitable ride-sharing service in urban area, disclosed by C. C. Tao, S. H. Chang, F. Y. Shyr, H. M. Chiu, H. C. Lee, C. C. Hung, C. J. Tsai, et. al., "Deployment of High Occupancy Vehicle Project using ITS Technologies-A Demonstration on Car/Ride Sharing System in Urban Area (Phase I)", Final report (in Chinese), MOTC, Taiwan, 2005. A research survey on taxi industry also shows that taxi-sharing service can achieve not only fuel-saving but also pollution-reducing, disclosed by S. Hartwig, M. Buchmann, "Empty Seats Traveling: Next-generation Ridesharing and its Potential to Mitigate Traffic- and mission problems in the 21th Century", Nokia Research center Bochum, Feb. 14, 2007.

However, traffic congestion problem is still a tough issue for all the cities. Thus, for the demand, designing a dynamic taxi-sharing system and a sharing method thereof to reduce economic and environmental impact has become an urgent issue for the application in the market.

SUMMARY OF THE INVENTION

A dynamic taxi-sharing system is disclosed. The dynamic taxi-sharing system comprises a ride-sharing service provider, a plurality of ride-sharing requests and a service server. The ride-sharing service provider carries at least one passenger from a first current location to a first travel destination through a route in an area and sends registration information to a service server. The plurality of ride-sharing requests is sent to the service server, and each of the ride-sharing requests comprises a second current location and a second travel destination. The service server divides the area into n by n blocks, and n is an integer greater than 1. The service server comprises a ride-matching module which chooses a destination area in which the first travel destination is a center point, and divides the destination area into k by k blocks; wherein, k is an integer greater than 1 and smaller than n. According to the registration information and the ride-sharing requests, the ride-matching module matches at least one ride-sharing traveler, having the second current location close to the route and the second travel destination inside the destination area, to the ride-sharing service provider.

In this invention, a dynamic taxi-sharing method is further provided, comprising the following steps: carrying at least one passenger from a first current location to a first travel destination through a route in an area by a ride-sharing service provider; sending registration information to a service server by the ride-sharing service provider; sending a plurality of ride-sharing requests to the service server, each of the ride-sharing requests comprising a second current location and a second travel destination; dividing the area into n by n blocks by the service server, n being an integer greater than 1; choosing a destination area in which the first travel destination is a center point by a ride-matching module of the service server; dividing the destination area into k by k blocks by the ride-matching module, k being an integer greater than 1 and smaller than n; and matching at least one ride-sharing traveler, having the second current location close to the route and the second travel destination inside the destination area, to the ride-sharing service provider by the ride-matching module according to the registration information and the ride-sharing requests.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Exemplary embodiments of the present invention are described herein in the context of a dynamic taxi-sharing system and a sharing method thereof.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
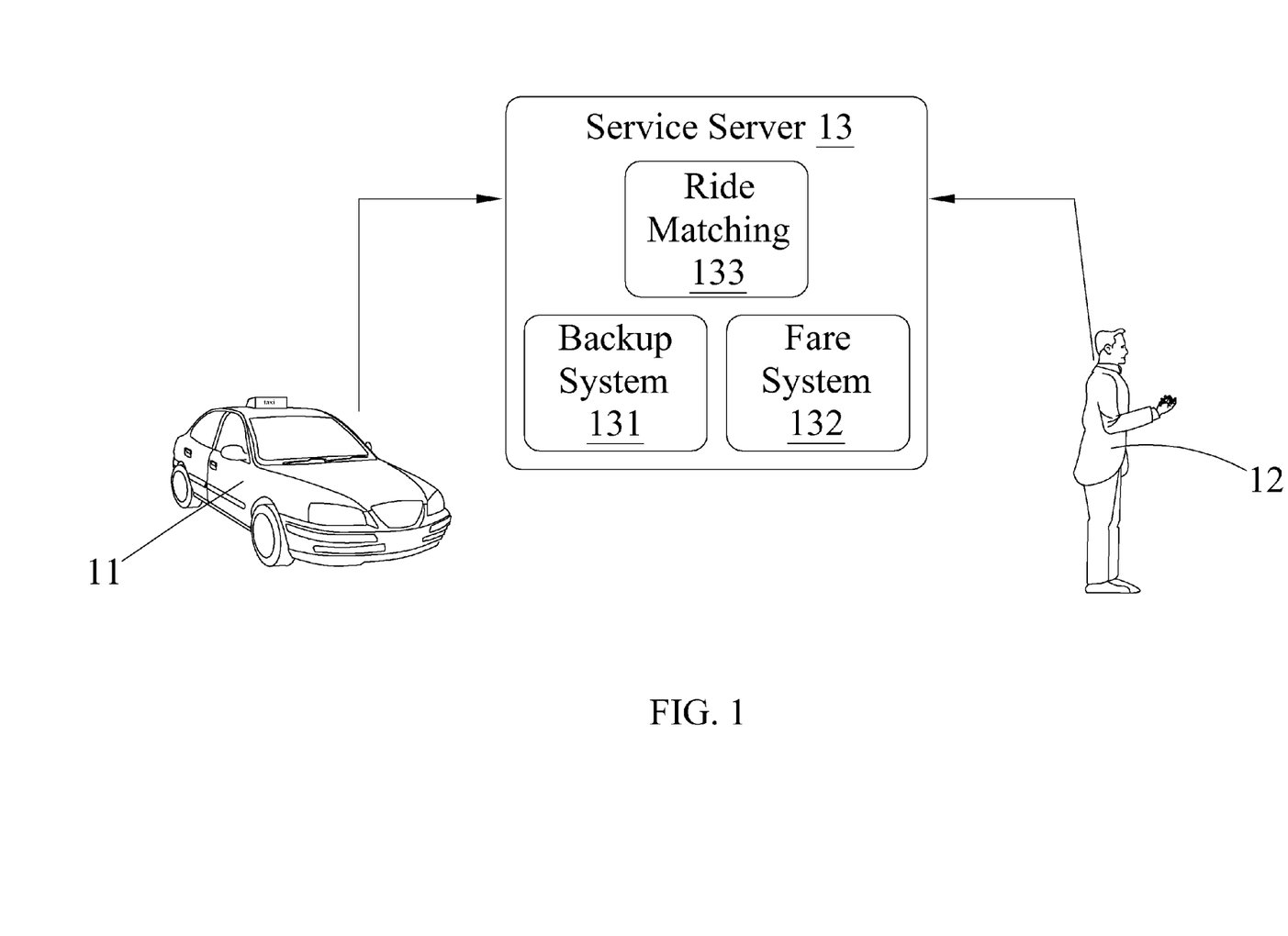
FIG. 1 is a schematic view illustrating an architecture of the dynamic taxi-sharing system according to the present invention.

This invention introduces the proposed dynamic taxi-sharing system. The system architecture consists of three major parts: Shared-ride Taxis 11, Ride-Sharing Travelers 12, and Service Management Center 13, as shown in FIG. 1. Each part is described as follows.

First, Shared-ride Taxis 11: when a taxi becomes a shared-ride taxi 11, it will send its information like taxi ID, current location, travel destination, and number of available seats to the service management center 13 via V2R communication to join the ride-matching process. The shared-ride taxi 11 here may mean that it already carries passengers and these passengers are willing to share a ride with others.

Second, ride-sharing travelers 12, who are willing to order a taxi-sharing service, can send their requests to the service management center 13 by cellular phones or Wi-Fi handheld devices. Each ride-sharing request may include three main information, travel source, travel destination, and number of travelers.

Third, the service management center 13 contains three main functions: backup system 131, fare system 132, and ride-matching module 133. (1) Backup System 131: Whenever ride-sharing travelers 12 feel unsatisfied with the ride-matching result, the backup system 131 will show them an alternative way using public transportation to their travel destination. (2) Fare System 132: This system is responsible for the distribution of taxi fare. (3) Ride-Matching 133: This part is responsible for the matching process which is the main contribution of the work. Through a proper ride-matching method, this invention can find a fuel-saving shared-ride taxi to a ride-sharing traveler as faster as possible. This means this invention can shorten requesters' waiting time. Remember that this is important for requesters because people do not want to spend too much time waiting for the matching results.

Figure 2A:
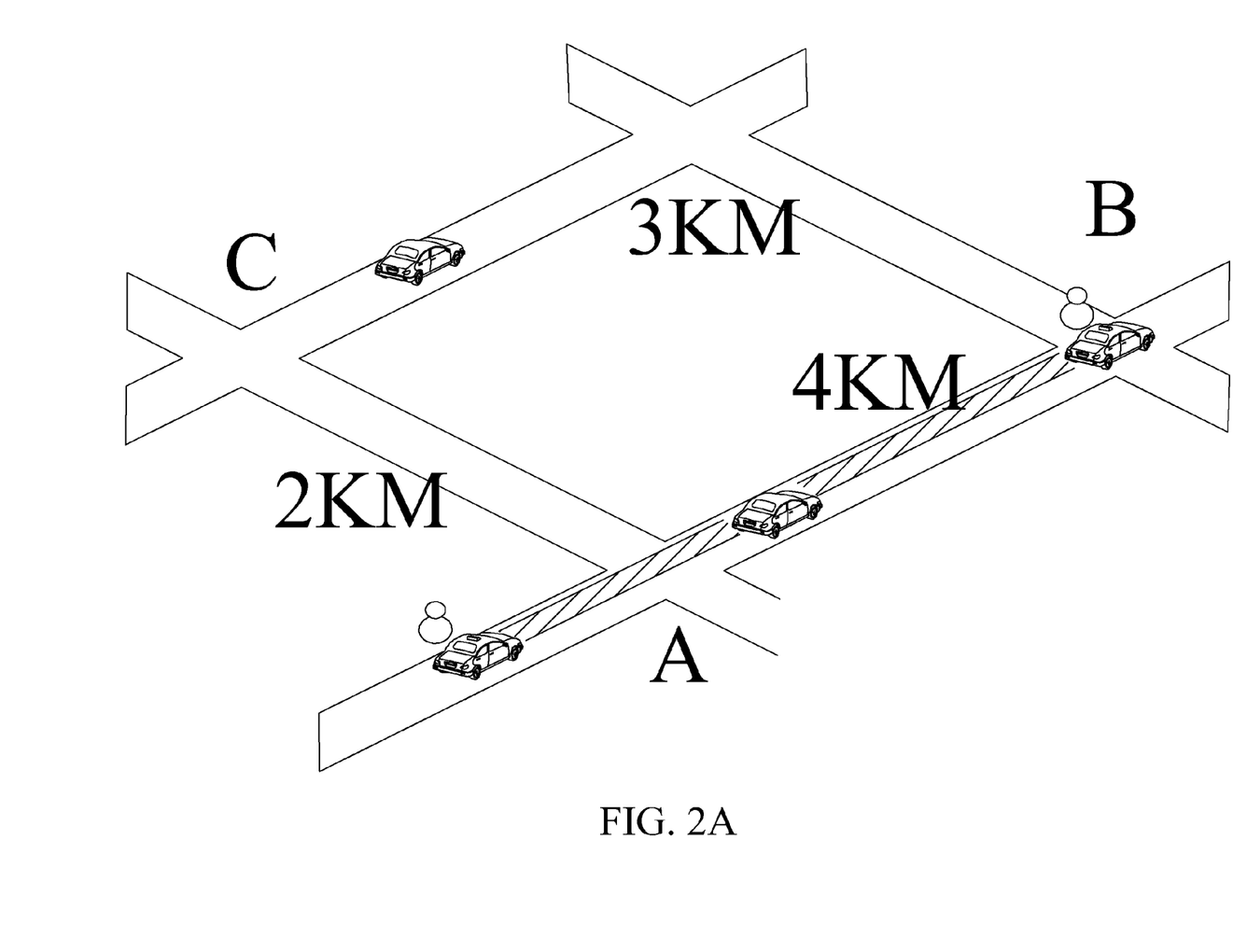
FIG. 2A is a schematic view illustrating the shortest path (A, B) of an embodiment according to the present invention.
Figure 2B:
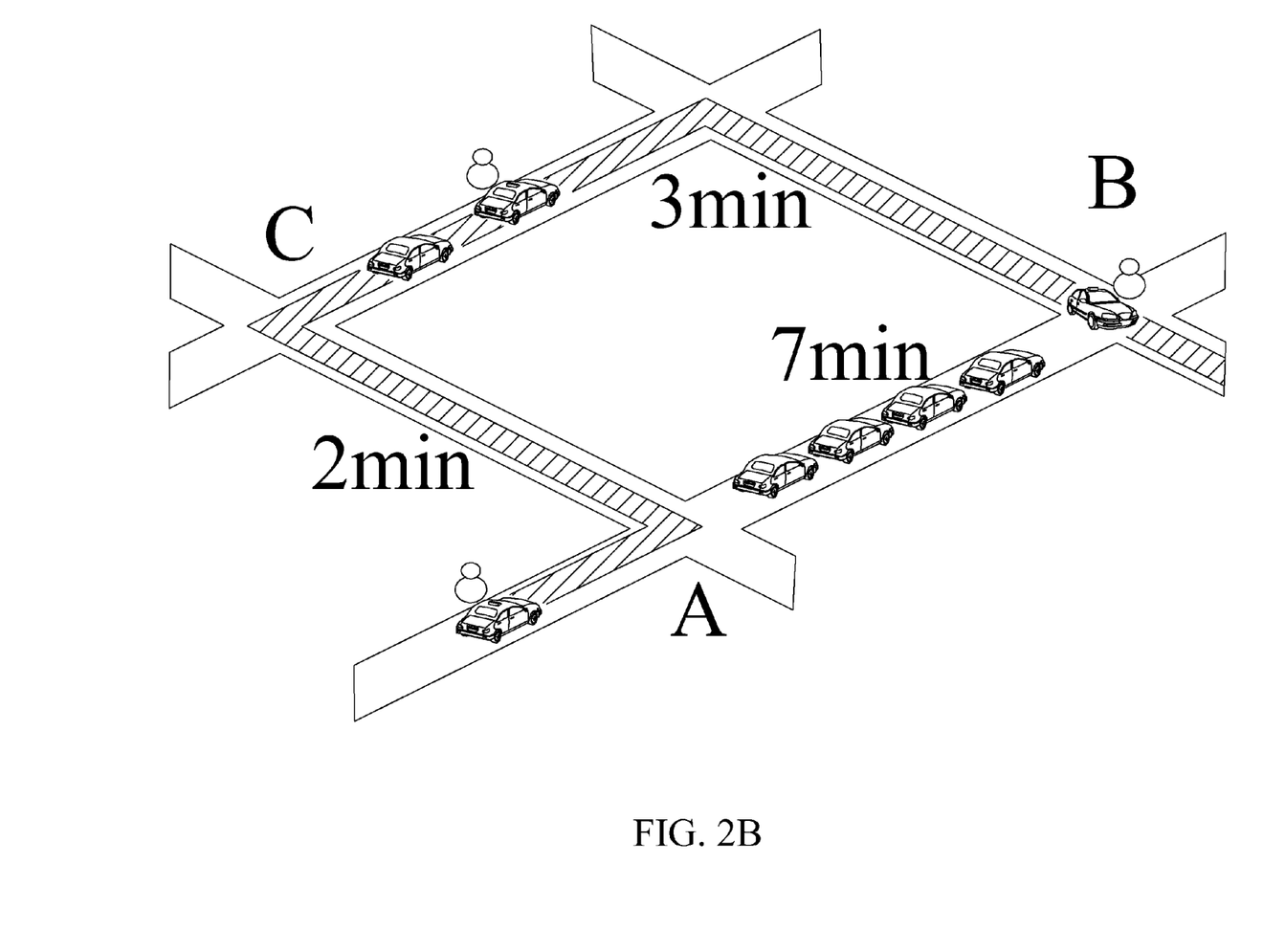
FIG. 2B is a schematic view illustrating the fastest path (A, C, B) due to traffic congestion of an embodiment according to the present invention.

Furthermore, this invention first presents how to use the road traffic information from ITSs to plan travel path. Generally speaking, when people drive to some place, people often choose a shortest path which equals to the fastest path while there is no traffic jam, as shown in FIG. 2 (a). However, this equation will be broken due to the traffic congestion, as shown in FIG. 2 (b). Thus this invention selects a faster travel path instead of the shortest path while planning travel path. TABLE I defines four matrices this invention will use in the ride-matching solution.

TABLE I

Matrix Definition

| Matrix name | Definition |
| --- | --- |
| Matrix T | Transit time of corresponding road section |
| Matrix F | Time cost of the fastest path of corresponding two intersections |
| Matrix P | The fastest path of corresponding two intersections |
| Matrix E | Fuel cost of the fastest path of corresponding two intersections |

Each matrix is an n×n matrix where n is the number of intersections. What's more, this invention also assumes every road section is bidirectional and both traffic conditions are similar, so these four matrices are symmetric matrices. Then, how to plan travel path by using matrices T, F and P is introduced in the following.

Figure 3A:
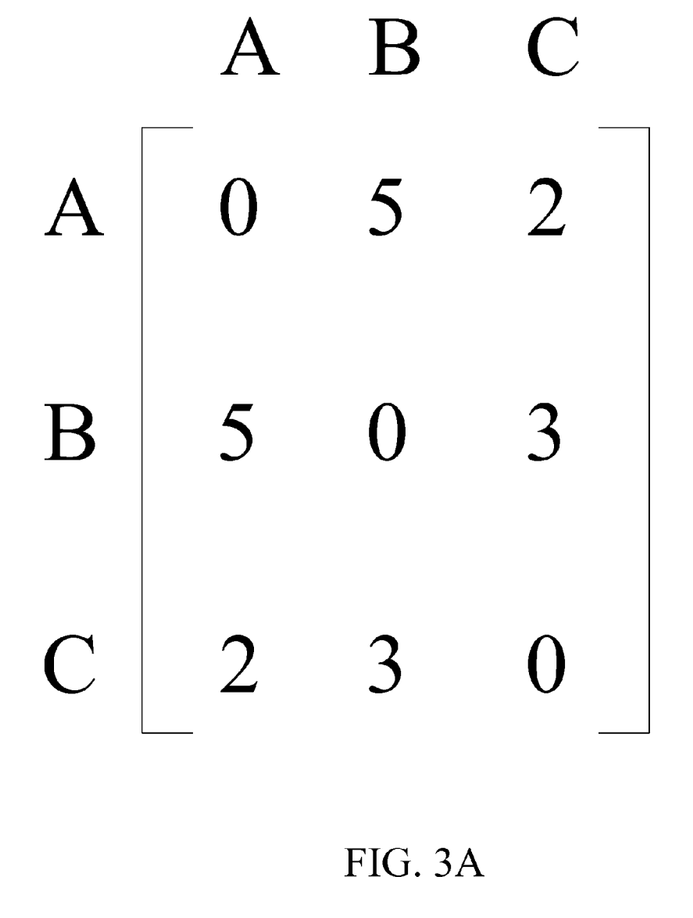
FIG. 3A is a matrix diagram illustrating time cost of the fastest path matrix F of an embodiment according to the present invention.
Figure 3B:
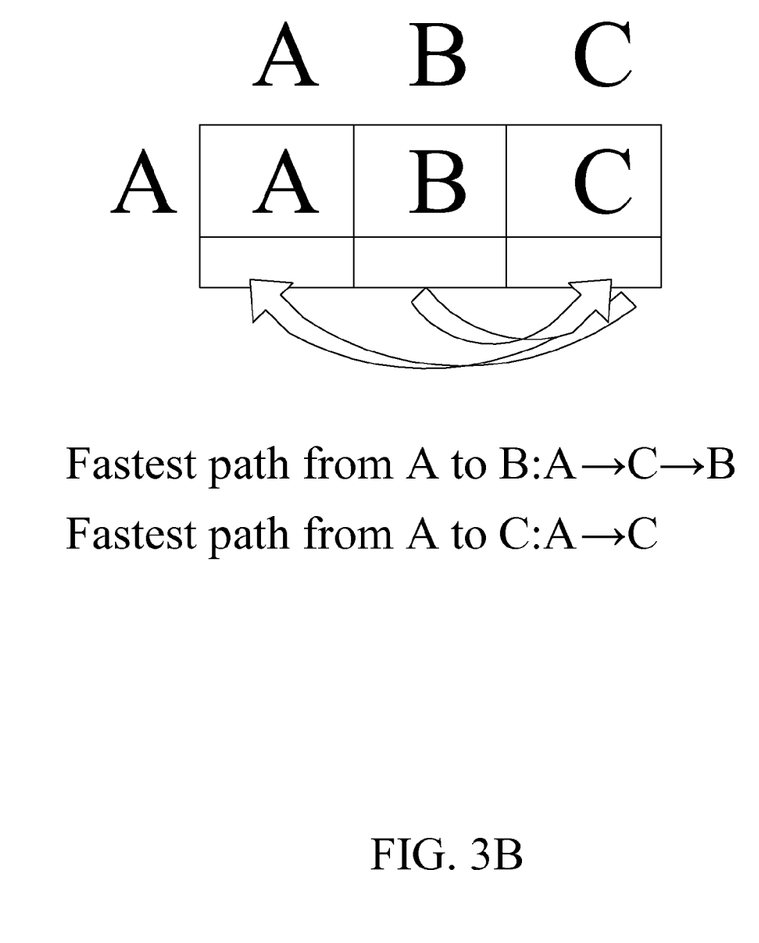
FIG. 3B is a matrix diagram illustrating time cost of the fastest path matrix P of an embodiment according to the present invention.

(1) The matrix T is first used to present the road traffic information receiving from ITSs. In this matrix, each element represents the transit time of corresponding road section. (2) Then, the matrix T and Dijkstra's shortest path algorithm is used to derive matrix P and matrix F, which represents the fastest path of any two intersections and the time cost of the fastest path, respectively. In the proposed method, for each row of matrix F and P, Dijkstra algorithm is run once to obtain single-source shortest paths, which is a $O(n^2)$ time complexity. So, the proposed method contributes to a total of $O(n^3)$ time complexity. Furthermore, because the value of each element in T is time cost instead of path length, the result obtained is the fastest path instead of shortest path. FIG. 2 is an example, and its corresponding matrices F and P are shown in FIG. 3. It is worth noting that each element of matrix P has a pointer that points to its previous intersection of single-source fastest path obtained In addition, on searching a suitable shared-ride taxi through the whole service area will cause huge communication overhead and increase the response time. So, in the following, this invention presents how to narrow down the searching space. Thus the dynamic taxi-sharing system can reduce both communication overhead on driving information and shorten requesters' waiting time.

(1) The dynamic taxi-sharing system assumes that each shared-ride taxi can only provide one ride-sharing service per trip. Furthermore, for each shared-ride taxi, whether there are enough seats for a certain ride-sharing request is also checked. That is, each shared-ride taxi that will be taken into searching space has to satisfy the following requirement.

Remaining seats≥Number of travelers of a certain group (2) For further reducing the size of searching space, the dynamic taxi-sharing system only selects shared-ride taxis whose travel destinations are near to the travel destination of a certain ride-sharing request to be candidates for this ride-sharing request. This step provides an alternative way that the system only has to find the most fuel-saving shared-ride taxi from candidates for the ride-sharing request instead of all shared-ride taxis.

Figure 4:
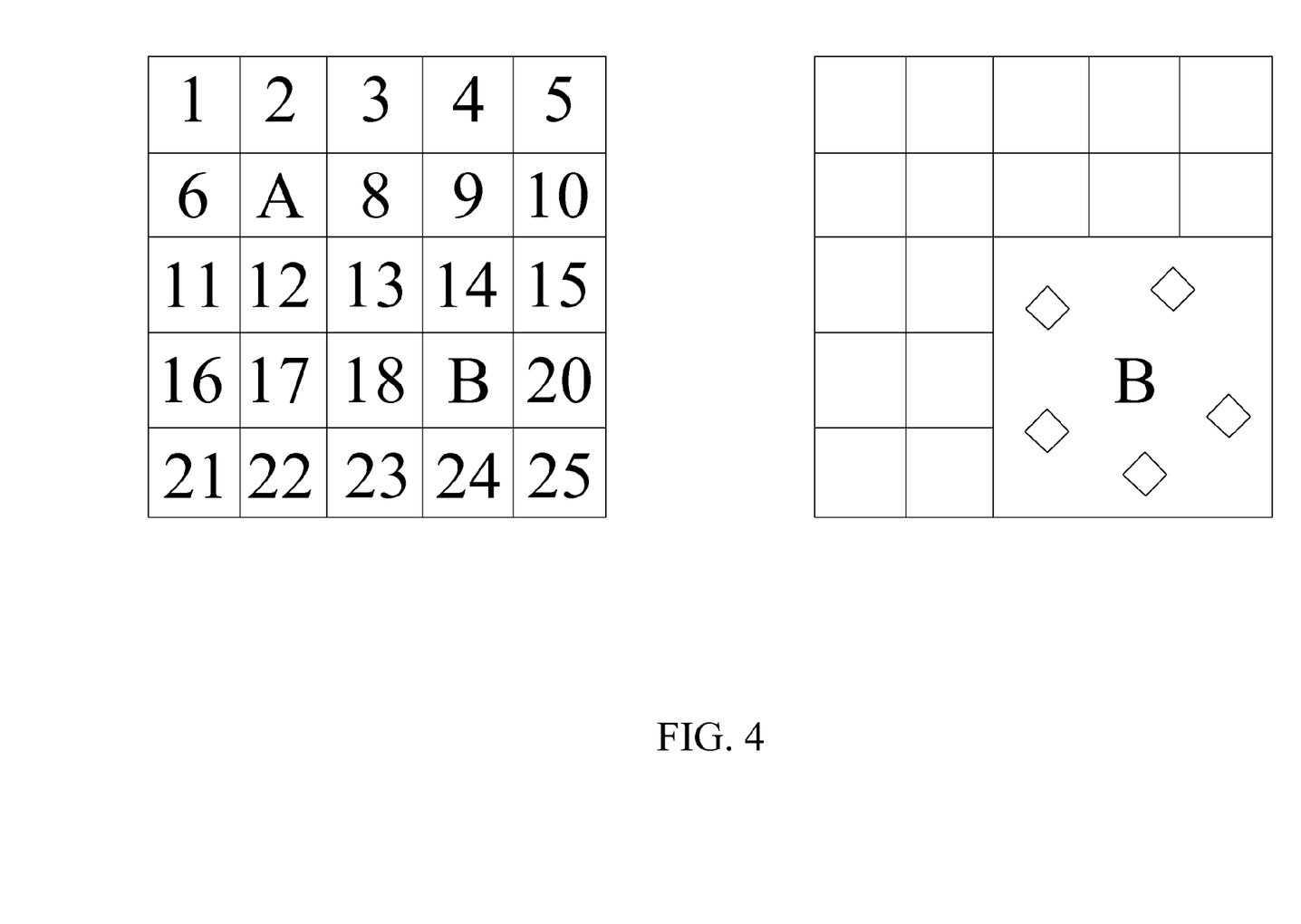
FIG. 4 is a schematic view illustrating the dividing of a simulation area of an embodiment according to the present invention.

By simulation results, that the invention can exactly reduce the size of searching space is found by using above two steps. Moreover, the most fuel-saving shared-ride taxi that the method selects can save almost the same amount of fuel as the one selected from all shared-ride taxis. FIG. 4 is an example to show how to select candidates. In this case, the dynamic taxi-sharing system first divides the whole area into 5×5 equivalent subareas. Then, for a certain request B, the dynamic taxi-sharing system defines that the candidate areas is a 3×3 subareas centered at the travel destination of B. So, the service management center selects shared-ride taxis whose travel destinations are in the corresponding candidate areas (in this case, which is subarea 13, 14, 15, 18, 19, 20, 23, 24 and 25) to be candidates and processes the cost function for every candidate to find the most fuel-saving shared-ride taxi.

Figure 5:
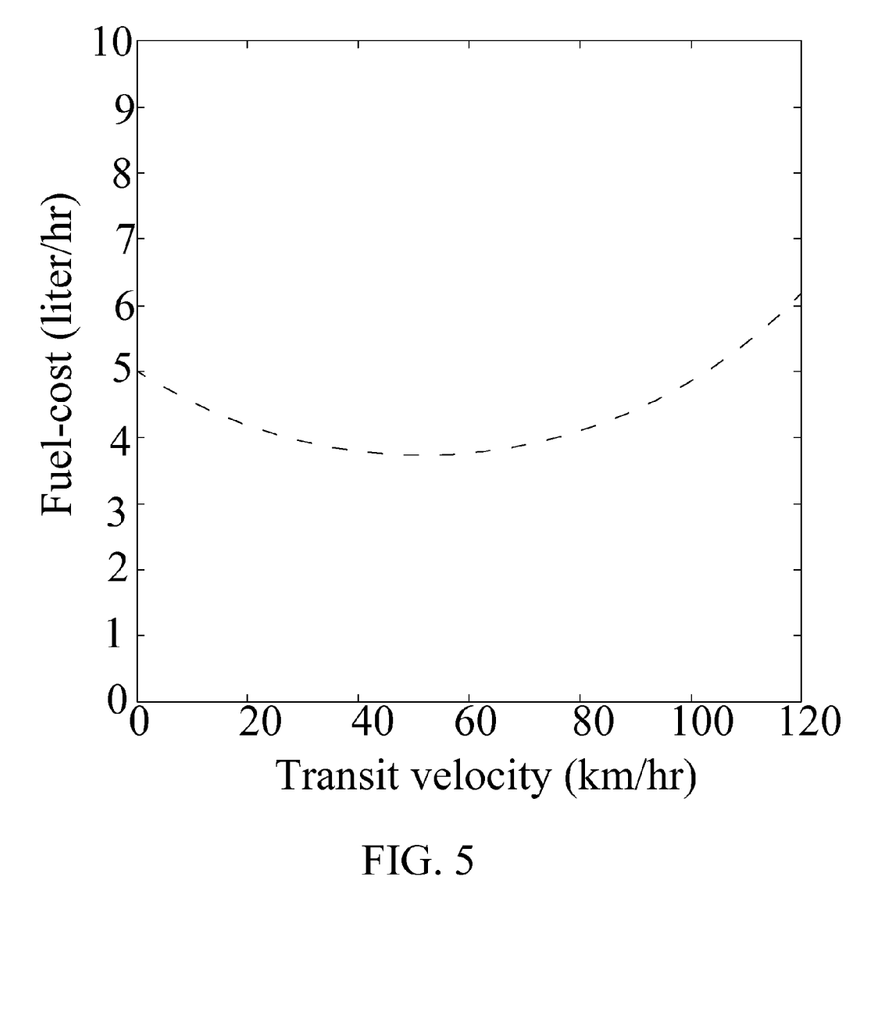
FIG. 5 is a curve diagram illustrating a relationship between fuel-cost and transit velocity of an embodiment according to the present invention.

How to build fuel-cost matrix E is introduced. The dynamic taxi-sharing system uses the following function to present the relationship between fuel-cost (liter/hr) and transit velocity (km/hr).

$$C(V)=5*(aV^2-bV+c)$$

The coefficients a, b and c of above function will change according to different type of vehicle. However, without losing generality, that the pair (a, b, c) to be (0.0001, 0.01, 1) is assumed, and the illustration of relationship between fuel-cost and transit velocity is shown in FIG. 5. Then matrix E is built by using above function, road transit velocity information from ITSs and matrix T.

Figure 6:
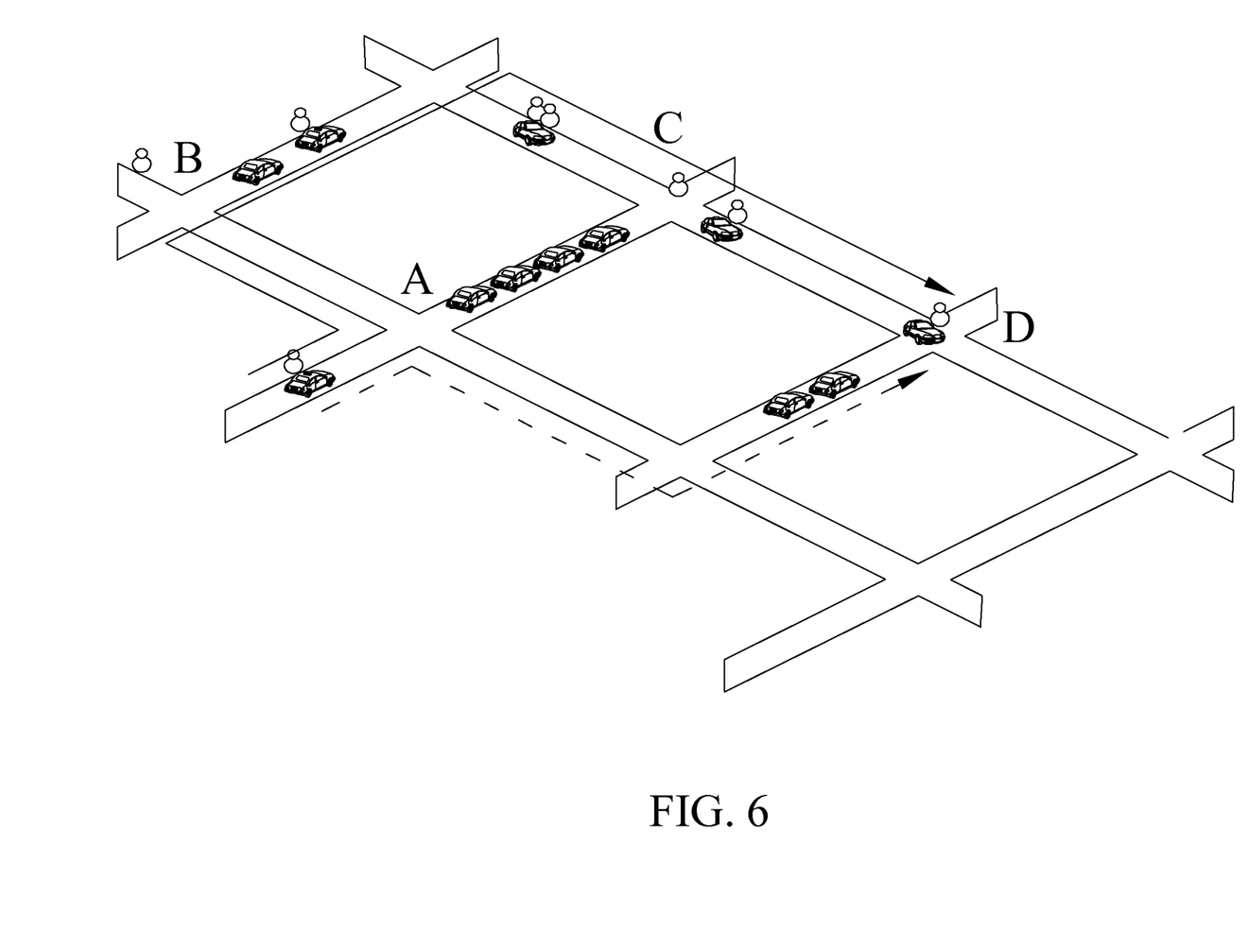
FIG. 6 is a schematic view illustrating an example of the cost function according to the present invention.

Because the main objective of this taxi-sharing system is to save fuel, the primary consideration of the cost function is the difference in fuel consumption before and after a ride-sharing service. In FIG. 6, points A and D are current location and travel destination of a candidate, respectively. Points B and C are travel source and destination of a request, respectively. The path in dash line is the fastest path for this candidate; however, this candidate will have to change to drive on the path in solid line if it needs to share a ride with this requester. So the cost function can be written as following:

$$\min\{(E(A,B)+E(B,C)+E(C,D))-(E(A,D)+E(B,C)),(E(A,B)+D)+E(D,C))-(E(A,D)+E(B,C))\}$$

The system will choose the smaller value of above two formulas to be the cost value of this candidate and choose a candidate with the smallest cost among all candidates to be the service provider. Furthermore, this step also decides that which travel destination (C or D) should this candidate arrive at first.

To sum up the approach, the road traffic information from ITSs to plan travel path is first used. Then, for a certain ride-sharing request, the system only selects shared-ride taxis whose travel destinations are near to which of the request and whose remaining seats are enough for this request to be candidates. Finally, for all candidates, a cost function is proposed to find which candidate has the biggest cost, and thus, this candidate is so-called the most fuel-saving shared-ride taxi in the approach.

Moreover, this invention uses simulations to evaluate the dynamic taxi-sharing system and compare the approach with other two systems, one is a dynamic taxi-sharing system without the shorten steps described in section IV-B (ALL) and the other one (FREQUEST) is a dynamic taxi-sharing system proposed in C. C Tao and C. J Wu, "Behavioral Responses to Dynamic Ridesharing Services," in Service Operations and Logistics, and Informatics. (IEEE/SOLI '08), pp. 1576-1581, October 2008. This invention also shows the result of no taxi-sharing service (NOSHARE).

Figure 7:
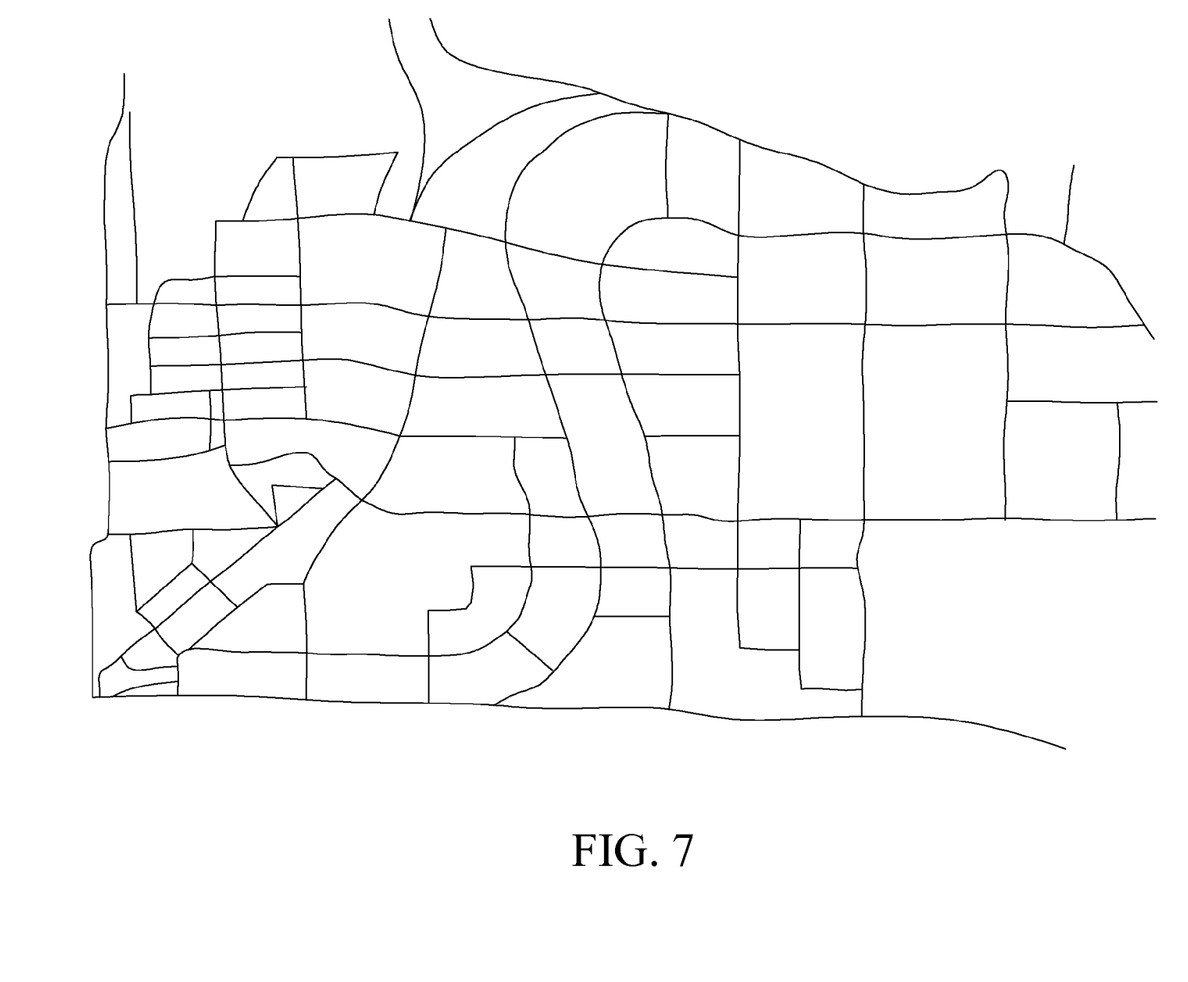
FIG. 7 is a schematic view illustrating a simulation map according to this invention.

The simulation map is a 7 km×15 km area which is divided into 100 equal subareas, as shown in FIG. 7. In the simulation, road sections which close to the center of the map are assumed to be in traffic congestion. 110 intersections are chosen in the simulation map and some intersections which are too close are ignored. In the simulation, 5 different road traffic conditions are also defined and each road traffic condition is assigned a transit velocity from 18 km/hr to 90 km/hr. There are 1500 ride-sharing requests whose travel source, destination, and number of travelers are randomly assigned. In each experiment, each case is run 500 times.

Figure 8:
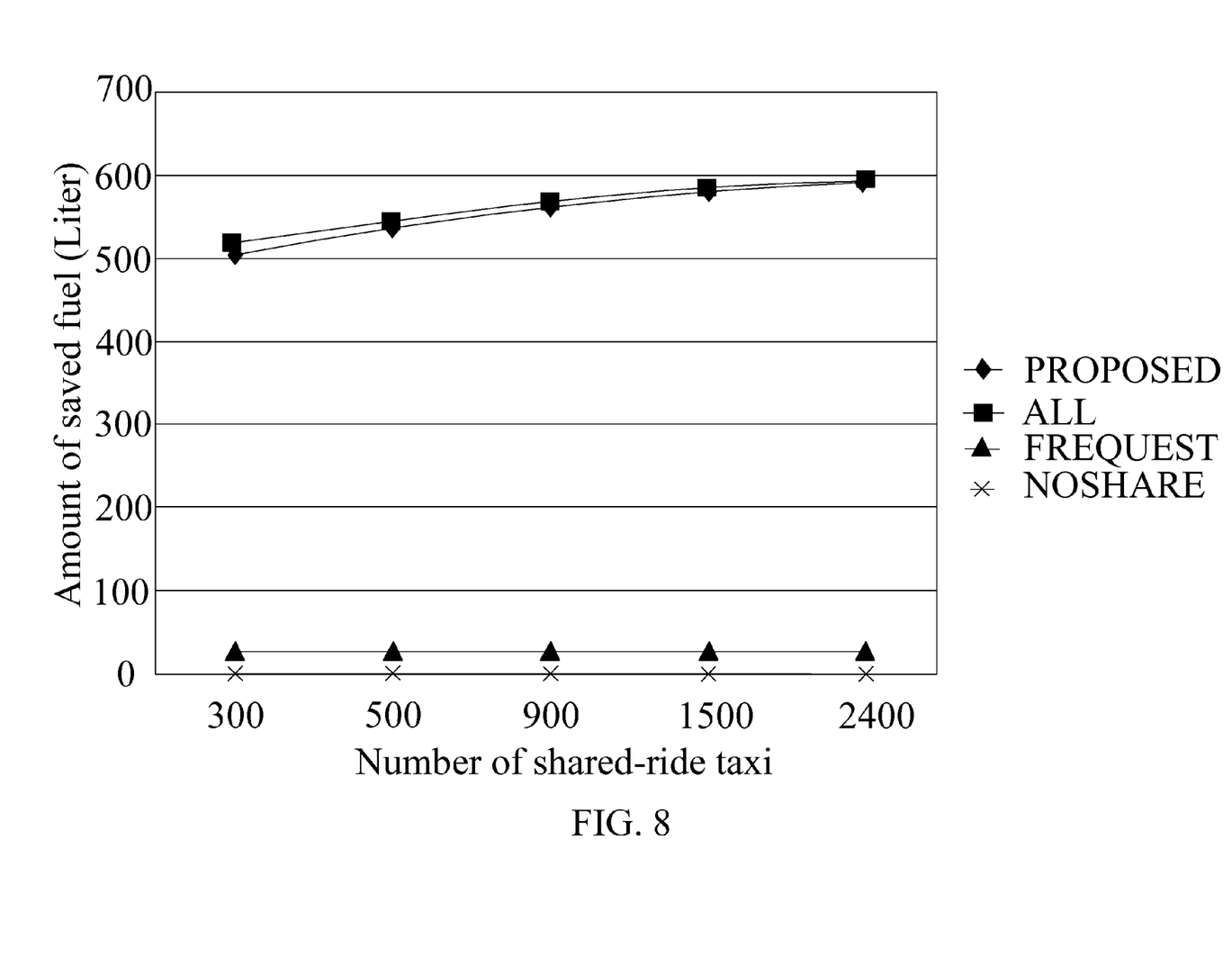
FIG. 8 is a simulation result showing the amount of saved fuel according to the present invention.

Performance is evaluated on the amount of saved fuel and the result is shown in FIG. 8. The total amount of fuel consumption after serving 1500 requests is about 617 L. The results of NOSHARE and FREQUEST only change a little while the number of shared-ride taxi increases because this two approaches do not take advantage of shared-ride taxis. The results of the proposed system and ALL. Both systems can perform well on reducing the total amount of fuel consumption; what's more, the proposed system can perform as well as ALL while the number of shared-ride taxis increases. The additional time cost are computed for a shared-ride taxi picking ride-sharing travelers up in the proposed system and the additional time cost is less than 10 seconds in average.

Figure 9:
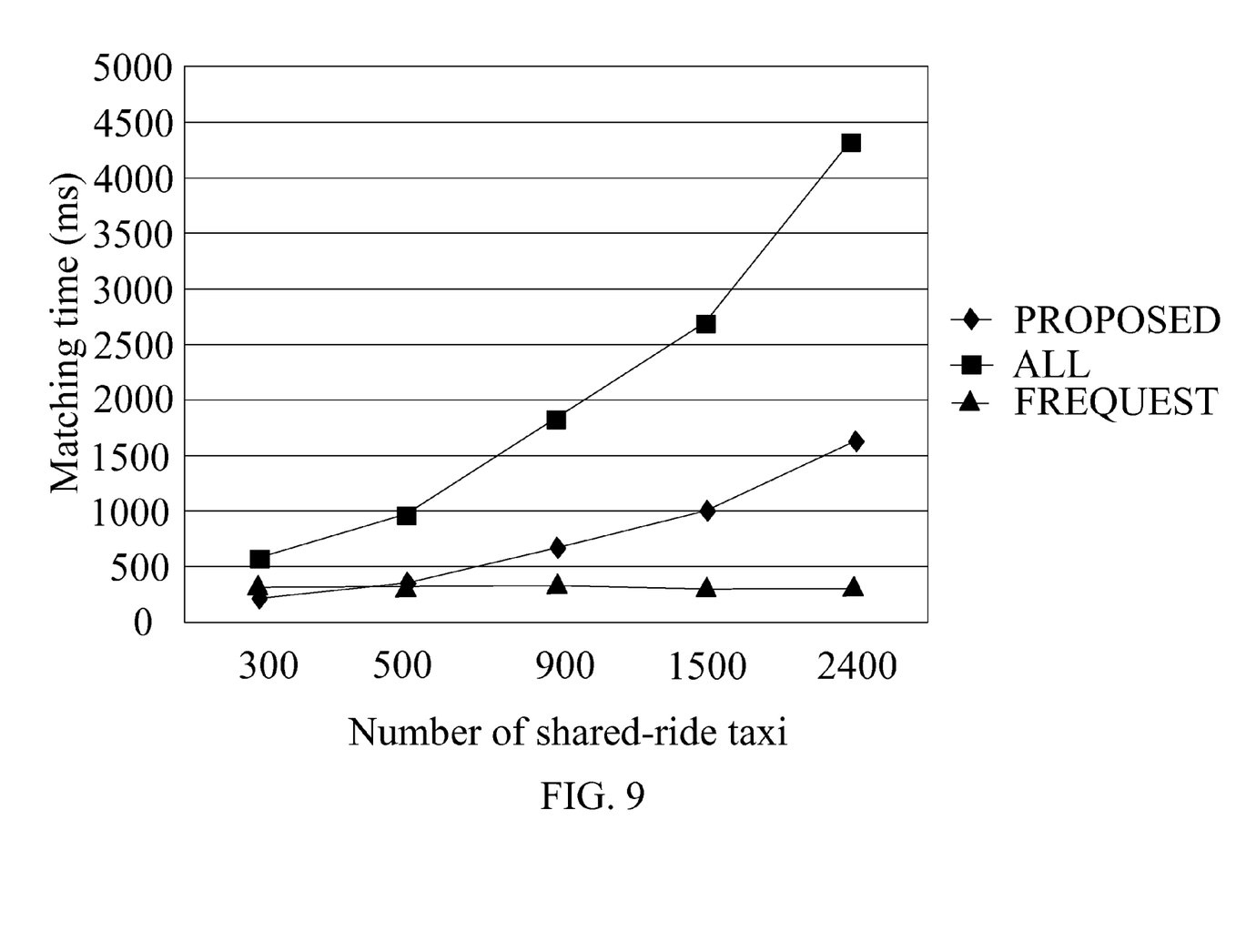
FIG. 9 is a simulation result showing the matching time according to the present invention.

In FIG. 9, performance is evaluated on ride-matching time. FREQUEST is almost unchanged because it only affected by number of ride-sharing requests. It can be seen that the proposed system increases more smoothly than ALL because the proposed system use the shorten process in section IV-B. This result shows that the system can prevent the situation: the more popular taxi-sharing system is, the more time every requester needs to wait. Remember that reducing matching time is important because the willingness of people using the proposed system will decrease while they need to wait for their matching results for a long time.

Figure 10:
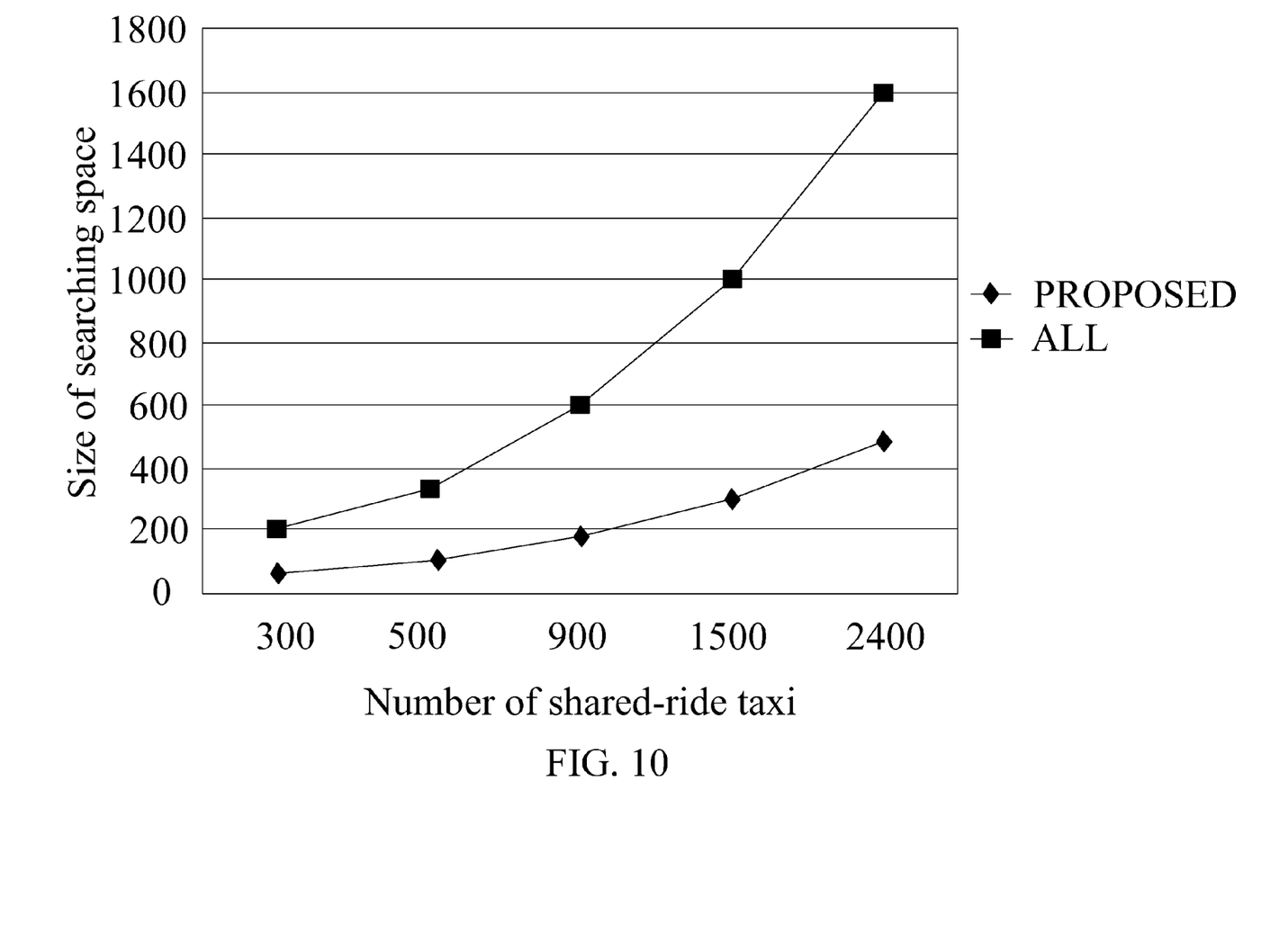
FIG. 10 is a simulation result showing the size of searching space according to the present invention.

Performance is finally evaluated on reducing the searching space in one ride-sharing request and the result is shown in FIG. 10. The fact that the shorten process in section IV-B can exactly reduce the searching space which is only about 30.2% of ALL's result, and thus both matching time and communication overhead of the proposed system can be reduced. The reduction of communication overhead is because that the proposed system only needs to require candidates instead of all shared-ride taxis to return their current locations.

In this invention, a dynamic taxi-sharing system and a sharing method thereof are disclosed, and can combine travelers with a taxi which has already carried passengers. Thus, this invention can reduce the amount of vehicles on surface streets by improving the average ratio of taxi seat occupancy and ease traffic congestion. In the system, every ride-sharing request can be served without any human coordination and prior knowledge. The simulation results also show that the system can outperform FREQUEST and perform as well as ALL on saving fuel. Furthermore, the system can exactly reduce the size of searching space, and thus, the system can speed system responding time and reduce the communication overhead in VANET. With the well-behaved performance on saving fuel and system responding time, the likelihood of people using this system increases, which can attract more taxis to join this system. Therefore, the performance can be further improved.

To sum up, in this invention, the image capturing device and the image capturing method thereof has one or more advantages, as follows:

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A dynamic taxi-sharing system, comprising:
   a ride-sharing service provider carrying at least one passenger from a first current location to a first travel destination through a route in an area and sending registration information to a service server computer;
   a plurality of ride-sharing requests being sent to the service server computer, each of the ride-sharing requests comprising a second current location and a second travel destination; and
   the service server computer dividing the area into n by n blocks, n being an integer greater than 1, the service server computer choosing a destination area in which the first travel destination is a center point and dividing the destination area into k by k blocks, k being an integer greater than 1 and smaller than n, according to the registration information and the ride-sharing requests, service server computer matching at least one ride-sharing traveler, having the second current location close to the route and the second travel destination inside the destination area, to the ride-sharing service provider;
   wherein the n×n blocks are represented by a matrix, and each element of the matrix represents a transit time of a corresponding road section of the area for obtaining a fastest path to the first travel destination and the second travel destination.

2. The dynamic taxi-sharing system as claimed in claim 1, wherein the registration information comprising a number of available seats, the ride-sharing request comprising a number of ride-sharing travelers, and the service server computer matching the at least one ride-sharing traveler to the ride-sharing service provider based on a condition that the number of available seats is greater than or equal to the number of ride-sharing travelers.

3. The dynamic taxi-sharing system as claimed in claim 1, wherein the registration information further comprises an identity of the ride-sharing service provider.

4. The dynamic taxi-sharing system as claimed in claim 1, wherein the plurality of ride-sharing requests are sent to the service server by a plurality of cellular phones or a plurality of Wi-Fi handheld devices.

5. The dynamic taxi-sharing system as claimed in claim 1, wherein the service server computer chooses a most fuel-saving route for both the ride-sharing service provider and the at least one ride-sharing traveler being matched to the ride-sharing service provider.

6. The dynamic taxi-sharing system as claimed in claim 1, wherein the service server computer further comprises a backup system giving an alternative way for the at least one ride-sharing traveler using public transportation to the second travel destination.

7. The dynamic taxi-sharing system as claimed in claim 1, wherein the service server computer further comprises a fare system being responsible for a distribution of the ride-sharing service provider's fare.

8. The dynamic taxi-sharing system as claimed in claim 1, wherein the registration information comprising a first preference, the ride-sharing request comprising a second preference, and the service server computer matching the at least one ride-sharing traveler to the ride-sharing service provider based on the first preference and the second preference.

9. A computer-implemented dynamic taxi-sharing method, comprising the following steps:
   carrying at least one passenger from a first current location to a first travel destination through a route in an area by a ride-sharing service provider;
   sending registration information to a service server computer by the ride-sharing service provider;
   sending a plurality of ride-sharing requests to the service server computer, each of the ride-sharing requests comprising a second current location and a second travel destination;
   dividing by the service server computer, the area into n by n blocks by the service server, n being an integer greater than 1;
   choosing a destination area in which the first travel destination is a center point by a ride-matching module of the service server computer;
   dividing, by the service server computer, the destination area into k by k blocks by the ride-matching module, k being an integer greater than 1 and smaller than n; and
   matching at least one ride-sharing traveler, having the second current location close to the route and the second travel destination inside the destination area, to the ride-sharing service provider by the service server computer according to the registration information and the ride-sharing requests;
   wherein the n×n blocks are represented by a matrix, and each element of the matrix represents a transit time of a corresponding road section of the area for obtaining a fastest path to the first travel destination and the second travel destination.

10. The computer-implemented dynamic taxi-sharing method as claimed in claim 9, further comprising the following step:
   matching the at least one ride-sharing traveler to the ride-sharing service provider by the service server computer based on a condition that a number of available seats of the registration information is greater than or equal to a number of ride-sharing travelers of the ride-sharing request.

11. The computer-implemented dynamic taxi-sharing method as claimed in claim 9, wherein the registration information further comprises an identity of the ride-sharing service provider.

12. The computer-implemented dynamic taxi-sharing method as claimed in claim 9, further comprising the following step:
sending the plurality of ride-sharing requests to the service server computer by a plurality of cellular phones or a plurality of Wi-Fi handheld devices.

13. The computer-implemented dynamic taxi-sharing method as claimed in claim 9, further comprising the following step:
choosing a most fuel-saving route for both the ride-sharing service provider and the at least one ride-sharing traveler being matched to the ride-sharing service provider by the service server computer.

14. The computer-implemented dynamic taxi-sharing method as claimed in claim 9, further comprising the following step:
giving an alternative way for the at least one ride-sharing traveler using public transportation to the second travel destination by a backup system of the service server computer.

15. The computer-implemented dynamic taxi-sharing method as claimed in claim 9, further comprising the following step:
calculating a distribution of the ride-sharing service provider's fare by a fare system of the service server computer.

16. The computer-implemented dynamic taxi-sharing method as claimed in claim 9, further comprising the following step:
matching the at least one ride-sharing traveler to the ride-sharing service provider by the service server computer based on a first preference of the registration information and a second preference of the ride-sharing request.

* * * * *